US012576464B2

(12) United States Patent
Smith et al.

(10) Patent No.: US 12,576,464 B2
(45) Date of Patent: *Mar. 17, 2026

(54) NICKEL-CHROMIUM ALLOY AND METHOD OF MAKING THE SAME

(71) Applicant: AMETEK, Inc., Berwyn, PA (US)

(72) Inventors: Ryan A. Smith, Cheshire, CT (US); Muktesh Paliwal, Brookfield, CT (US); Kerry B. Daley, Meriden, CT (US)

(73) Assignee: AMETEK, INC., Berwyn, PA (US)

( * ) Notice: Subject to any disclaimer, the term of this patent is extended or adjusted under 35 U.S.C. 154(b) by 534 days.

This patent is subject to a terminal disclaimer.

(21) Appl. No.: 17/469,368

(22) Filed: Sep. 8, 2021

(65) Prior Publication Data

US 2021/0402524 A1 Dec. 30, 2021

Related U.S. Application Data

(63) Continuation of application No. 14/478,231, filed on Sep. 5, 2014, now Pat. No. 11,130,201.

(51) Int. Cl.
 *B23K 35/30* (2006.01)
 *B22F 3/18* (2006.01)
 (Continued)

(52) U.S. Cl.
 CPC .............. *B23K 35/304* (2013.01); *B22F 3/18* (2013.01); *C21D 9/52* (2013.01); *C22C 1/0433* (2013.01);
 (Continued)

(58) Field of Classification Search
 CPC .. B22F 1/0003; B22F 1/09; B22F 1/12; B22F 2003/248; B22F 2201/013; B22F 2998/10;
 (Continued)

(56) References Cited

U.S. PATENT DOCUMENTS

| 2,023,818 A | 12/1935 | Muller |
| 2,990,301 A | 6/1961 | Clemens |
| (Continued) | | |

FOREIGN PATENT DOCUMENTS

| GB | 1559690 | 1/1980 |
| JP | 0952194 A | 2/1997 |
| (Continued) | | |

OTHER PUBLICATIONS

European Communication for European Application No. 15 183 897.6, dated Apr. 25, 2017, 3 pages.

(Continued)

*Primary Examiner* — Sang Y Paik

(74) *Attorney, Agent, or Firm* — Buchanan Ingersoll & Rooney PC

(57) ABSTRACT

A nickel and chromium alloy having a combined wt. % of nickel and chromium of at least 97 wt. %, wherein the chromium accounts for 33 to 50 wt. % of the alloy. The alloy may be provided in strip form and has adequate ductility for the manufacture of various products, such as sheaths for flux cored welding electrodes. A method of making the alloy strip includes forming a powder charge that is 97 to 100 wt. % of nickel and chromium combined and the chromium accounts for 33 to 50 wt. % of the charge, roll compacting the powder charge to form a green strip, sintering the green strip to form a sintered strip, and cold rolling and annealing the sintered strip to form the alloy strip.

20 Claims, 1 Drawing Sheet

(51) Int. Cl.

| | |
|---|---|
| *C21D 9/52* | (2006.01) |
| *C22C 1/04* | (2023.01) |
| *C22C 19/05* | (2006.01) |
| *B22F 3/24* | (2006.01) |

(52) U.S. Cl.

CPC ............ *C22C 19/05* (2013.01); *C22C 19/052* (2013.01); *B22F 3/24* (2013.01); *B22F 2003/248* (2013.01); *B22F 2998/10* (2013.01); *B22F 2999/00* (2013.01)

(58) Field of Classification Search

CPC ...... B22F 2999/00; B22F 3/1007; B22F 3/18; B22F 3/24; B23K 35/304; C21D 9/52; C22C 1/0433; C22C 19/05; C22C 19/052

USPC .... 219/136, 137 R, 137 WM, 145.1–145.32, 219/146.1–146.51

See application file for complete search history.

(56) References Cited

U.S. PATENT DOCUMENTS

| | | | |
|---|---|---|---|
| 3,113,021 | A | 12/1963 | Witherell |
| 3,519,419 | A | 7/1970 | Gibson et al. |
| 3,520,043 | A | 7/1970 | Darling |
| 3,848,109 | A | 11/1974 | Zvanut |
| 3,984,239 | A | 10/1976 | Peterson |
| 4,158,719 | A * | 6/1979 | Frantz .................. B22F 1/0003 |
| | | | 257/E23.053 |
| 4,373,970 | A | 2/1983 | Scorey et al. |
| 5,837,969 | A * | 11/1998 | Siewert ................ C22C 38/001 |
| | | | 219/137 WM |
| 5,993,731 | A * | 11/1999 | Jech .......................... C22C 1/05 |
| | | | 419/30 |
| 6,242,113 | B1 | 6/2001 | Kiser |
| 8,568,901 | B2 | 10/2013 | Kiser et al. |
| 8,603,389 | B2 | 12/2013 | Kiser |
| 8,973,806 | B2 | 3/2015 | Cheney |
| 11,130,201 | B2 * | 9/2021 | Smith ....................... B22F 3/18 |
| 2005/0000603 | A1 | 1/2005 | Corrigan et al. |
| 2005/0183797 | A1 * | 8/2005 | Ray .......................... C22C 19/03 |
| | | | 148/556 |
| 2011/0100970 | A1 | 5/2011 | Quintana et al. |
| 2013/0004786 | A1 | 1/2013 | Croopnick et al. |
| 2013/0306602 | A1 | 11/2013 | Kawamoto et al. |
| 2014/0261905 | A1 | 9/2014 | Blejde et al. |
| 2015/0078950 | A1 | 3/2015 | Paliwal et al. |
| 2015/0093288 | A1 | 4/2015 | Hattendorf |

FOREIGN PATENT DOCUMENTS

| | | |
|---|---|---|
| JP | 11285890 A | 10/1999 |
| WO | 2008064214 A1 | 5/2008 |
| WO | 2013182178 A1 | 12/2013 |

OTHER PUBLICATIONS

Extended European Search Report for European Application No. EP 15 183 897.6, dated Jan. 21, 2016, 8 pages.

Extended European Search Report for European Application No. EP 19 178 899.1, dated Sep. 23, 2019, 7 pages.

Tuominen et al., "Corrosion Behavior of HVOF-Sprayed and Nd-YAG Laser-Remelted High-Chromium, Nickel-Chromium Coatings", Journal of Thermal Spray Technology, vol. 11(2), Jun. 2002, pp. 233-243.

Entire patent prosecution history of U.S. Appl. No. 14/478,231, filed Sep. 5, 2014, entitled, "Nickel-Chromium Alloy and Method of Making the Same.".

* cited by examiner

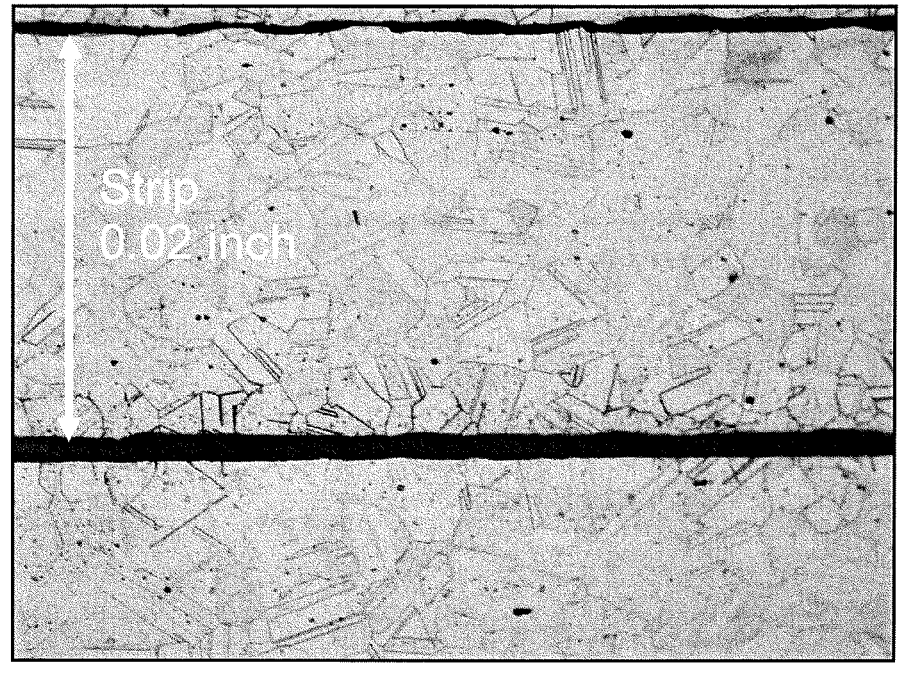

NICKEL-CHROMIUM ALLOY AND METHOD OF MAKING THE SAME

CROSS-REFERENCE TO RELATED APPLICATIONS

This application is a continuation of, and claims priority to, U.S. application Ser. No. 14/478,231, filed Sep. 5, 2014, the contents of this application being hereby incorporated herein by reference in its entirety.

FIELD OF THE INVENTION

The invention relates to nickel-chromium alloys and methods of making nickel-chromium alloys having improved ductility that may be provided in strip form. The strip may be used in a variety of applications including the manufacture of sheaths for flux cored welding electrodes.

BACKGROUND OF THE INVENTION

Ni—Cr alloys are used in many applications requiring high temperature oxidation and corrosion resistance. Ni—Cr alloys, with high chromium content (35%-60%) are used in cast form for applications in power plants and boilers where resistance to fuels, ashes, and deposits high in sulfur and vanadium content is required. Various alloys in strip form are widely used in many diverse applications, including the manufacture of welding consumables which can also be used for overlay coatings.

Conventional means of producing Ni—Cr alloy strip typically include adding nickel- and chromium-containing melt stocks into a suitable melting furnace (along with any desired alloying elements and other elements required to deoxidize and fluidize the melt), melting the charge, and casting it into an ingot. This ingot may then be processed by hot and cold working into strip, or may be re-melted to purify the composition and refine the cast grain structure prior to being hot and cold worked into strip. This strip may then be used as the outer sheath of a flux cored welding consumable, and as such its chemical composition needs to be tightly controlled because the elements contained in the strip will be incorporated into the weld bead or overlay when the welding consumable is subsequently used.

In general, Ni—Cr alloys, with high Cr content (greater than 30%) made by conventional means (melting and casting) are difficult to work and therefore generally not processed into strip form. The ductility of the Ni—Cr alloy is inversely proportional to the concentration of chromium because the chromium has a phase structure which is brittle. Ni—Cr alloys having a chromium content greater than 30% are generally only suited to casting. This occurs because segregation during the casting process results in the formation of large volumes of the brittle phases of chromium within the cast structure of the ingot and reduces the ductility of the alloy to the point where the alloy does not have sufficient ductility for working the cast ingot into a strip useable as a sheath in a flux cored welding electrode.

In contrast, welding consumable manufacturers desire to make products containing high chromium levels because these high chromium materials can produce weld beads or overlays that exhibit enhanced corrosion resistance and wear resistance. Thus, a cheaper base material can be overlaid with a layer of high chromium Ni—Cr alloy so that it will have sufficient corrosion or wear resistance in service. Because of the embrittlement problem with high chromium content Ni—Cr alloys, when a welding consumable manufacturer wishes to produce a product that is able to deposit a weld bead or overlay of Ni—Cr composition in excess of 33 weight percent (wt. %) chromium, the only means possible is to use commercially available strip for the weld wire sheath with lower than 33 wt. % chromium content and add the extra required chromium by blending chromium powder or a chromium alloy powder with the other constituents that are contained within the core of the welding wire. This, of course, adds costs to the manufacture of the welding consumable.

There is therefore a need to provide Ni—Cr alloy strip containing chromium in excess of 33 wt. % chromium balance nickel in strip form having adequate ductility and formability, so that it can be used as the sheath in flux cored welding consumables. This would reduce or eliminate the need to make chromium additions to the core of the welding wire, thereby lowering the cost of making such wire.

SUMMARY OF THE INVENTION

One aspect of the present invention is to provide an alloy in strip form comprising nickel and chromium having a combined wt. % of nickel and chromium of at least 97 wt. %, wherein the chromium accounts for 33 to 50 wt. % of the alloy.

Another aspect of the present invention is to provide an alloy comprising a combined wt. % of nickel and chromium of at least 99.8 wt. %, wherein the chromium accounts for 33 to 50 wt. % of the alloy.

Yet another aspect of the present invention is to provide a Ni—Cr strip made from an alloy according to the present invention having adequate ductility, such that it may be formed into various products, such as a sheath for a welding electrode.

Finally, yet another aspect of the present invention is to provide a method of making an alloy strip according to one embodiment of the present invention comprising forming a powder charge, wherein the powder charge comprises 97 to 100 wt. % of nickel and chromium combined and the chromium accounts for 33 to 50 wt. % of the charge; roll compacting the powder charge to form a green strip; sintering the green strip to form a sintered strip; and cold rolling and annealing the sintered strip to form the alloy strip.

BRIEF DESCRIPTION OF THE FIGURES

FIG. 1 is a magnified image of the microstructure of a Ni—Cr alloy strip made according to one embodiment of the present invention.

DETAILED DESCRIPTION

Generally, an embodiment of the present invention includes an alloy that may be made using a roll compaction process. The alloy may comprise nickel and chromium having a combined wt. % of nickel and chromium of at least 97 wt. %, wherein the chromium accounts for 33 to 50 wt. % of the alloy, more preferably 35 to 50 wt. %, and most preferably 40 to 50 wt. %, and the alloy may comprise less than 3 wt. % of Mn and Si combined. In certain embodiments, the nickel content of the alloy may be at least 47 wt. %. The alloy may be provided in strip form having a tensile elongation of at least 30%.

Another embodiment of the present invention includes an alloy comprising nickel and chromium having a combined wt. % of nickel and chromium of at least 99.8 wt. %, wherein the chromium accounts for 33 to 50 wt. % of the alloy, more preferably 35 to 50 wt. %, and most preferably 40 to 50 wt. %, and the alloy may exclude Mn and Si. In certain embodiments, the nickel content of the alloy may be at least 49.8 wt. %.

In yet another embodiment of the present invention, a method of making an alloy strip comprises forming a powder charge, wherein the powder charge comprises 97 to 100 wt. % of nickel and chromium combined and the chromium accounts for 33 to 50 wt. % of the charge; roll compacting the powder charge to form a green strip; sintering the green strip to form a sintered strip; and cold rolling and annealing the sintered strip to form the alloy strip. The powder charge may be formed from at least one of a nickel containing powder and chromium containing powder that is at least 99.5% pure. In certain embodiments, a sheath for a flux cored welding electrode may be made by forming the sheath from an alloy made according to the present invention.

As explained above, it is difficult to process Ni—Cr alloys into strip made by conventional means when the composition contains in excess of 33 wt. % chromium due to the presence of brittle phases. In light of this, current practice within the welding consumables manufacturing industry for making products capable of depositing a weld bead or overlay with more than 33 wt. % chromium content is to use a strip as the consumable sheath that contains less than 33 wt. % chromium and add chromium to the flux core to provide the additionally required chromium to the product. The present invention eliminates or reduces the necessity of additional chromium to the flux core since the strip produced can contain in excess of 33 wt. % chromium and still exhibit sufficient ductility and formability to be successfully processed into sheaths for flux cored welding electrodes.

To manufacture a Ni—Cr alloy strip having a chromium content which may be used in a welding consumable and have the ductility necessary to form the alloy into a sheath for a welding consumable, a process has been discovered within the scope of the invention that is able to provide a formable Ni—Cr alloy containing chromium in excess of 33 wt. %, preferably 33 to 50 wt. % chromium, more preferably 35 to 50 wt. % chromium, and most preferably 40 to 50 wt. % chromium. The combined wt. % of the nickel and chromium in the alloy may be at least 97%, preferably at least 98%, more preferably at least 99%, and most preferably at least 99.8%. The resulting alloy has ductility characteristics which allow it to be drawn and formed into wire or sheaths for welding consumables. The Ni—Cr alloy according to the present invention has improved ductility and is not negatively affected by the brittle phases associated with higher chromium levels when compared to conventional Ni—Cr alloys having similar Cr content made using the casting process.

As used herein throughout the specification and the claims, the term "strip" includes all materials commonly known in the industry as sheet, strip, or foil that is less than 0.050 inches in thickness.

Preferably, "sufficient ductility" is the extent to which the alloy may be formed without fracture. The extent to which mechanically forming stresses an alloy sheet or strip when making a welding consumable is well-known in the art. Thus, the process of the present invention enables the production of a Ni—Cr alloy having a high chromium content and sufficient ductility to endure the forming processes associated with the production of welding consumables. "Sufficient ductility" as used herein is defined as tensile elongation as determined using ASTM E8, the standard test method for tension testing of metallic materials and is at least 30%, more preferably at least 40%.

To manufacture a Ni—Cr alloy strip with a chromium content in excess of 33 wt. %, more preferably in excess of 35 wt. %, and most preferably in excess of 40 wt. %, that has sufficient ductility, so that it may be formed into a flux cored welding consumable, the present invention includes a process that eliminates melting. Because no melting is required to make the Ni—Cr alloy strip, there is no cast structure containing large grains of brittle phases even though the resulting strip will have a chromium content in excess of 33 wt. %.

An additional advantage of the present invention is that since no melting takes place, there is no need to add extra elements to the composition to facilitate the melting process (such as deoxidants or fluidizers) and there will be little to no loss of volatile alloying elements as can occur during melting. Therefore, in one embodiment of the present invention, an alloy is provided consisting essentially of nickel and chromium having a combined wt. % of nickel and chromium of at least 97 wt. %, wherein the chromium accounts for 33 to 50 wt. % of the alloy. Additional alloying elements other than nickel and chromium may be present in the alloy, for example, in trace amounts, but the additional alloying elements are not needed to obtain a strip of the alloy having a tensile elongation of at least 30%. Nickel-based alloys made by conventional melting and hot & cold rolling techniques typically have a Mn and Si content in the 0.5 to 2.0% range. In certain embodiments of the present invention, a Ni—Cr alloy is provided that is essentially void of Mn and Si. In a preferred embodiment of the invention, a Ni—Cr alloy is provided that may contain less than 3%, more preferably less than 1.5%, of Mn and Si combined. In some embodiments, the Ni—Cr alloy of the invention may comprise essentially 0% of Mn and/or Si. As used herein, "essentially 0%" means less than 100 ppm.

A process according to the present invention utilizes powder metallurgy, specifically roll compaction, and includes blending nickel and chromium containing powders in a ratio to make the desired Ni—Cr alloy composition, consolidating the powders into a green strip via roll compaction, sintering the green strip to increase its density and strength and homogenization of the alloying elements, followed by cold rolling and annealing the strip to a final thickness.

A "green" strip as used herein throughout the specification and the claims means a metal strip produced by roll compaction which has not yet been treated to strengthen the material by sintering. Following roll compaction, the green strip may be sintered under an atmosphere containing hydrogen to improve the strength and reduce the oxygen content of the strip. The sintered strip may then be mechanically worked (cold rolling). As used herein throughout the specification and the claims, the term "cold rolling" means mechanically working the strip below the recrystallization temperature of the material.

According to various embodiments of the invention, intermediate recrystallization anneals may be carried out as required between rolling cycles. The densification of the strip occurs during the sintering, cold rolling, and the recrystallization anneals. The final density of the material, or a value close to its theoretical density, is achieved after the cold rolling operations.

In one embodiment of the present invention, nickel and chromium powder may be combined to form the desired alloy composition. It is preferred to use high purity metal powders that are 99.5% pure. As used herein, "99.5% pure"

means at least 99.5 wt. % of the powder comprises nickel or chromium. In another embodiment, the metal powders may include a suitable mixed nickel-chromium powder to which a high purity nickel or chromium powder may be added to achieve the desired final weight percent of nickel and chromium in the alloy. When using powders of different constituents, the powders should be well mixed to insure homogeneity of the powder charge. In order to obtain the desired powder properties for roll compaction, these properties being apparent density, flow, and consolidation characteristics, along with the properties of the resulting green strip, the average particle size of the powders should be less than about 100 microns.

Other components known in the industry as additives or binders, which will preferably volatilize during subsequent processing, may be added to the powder charge to form a blend. Examples of these added components/additives would be dispersants, plasticizers, and sintering aids. Other known expedients may also be added for the purpose of altering the flow characteristics and the consolidation behavior of the powders in the blend. Suitable additives used for altering the characteristics of powders are well known in the art of powder metallurgy and include, for example, long chain fatty acids such as stearic acid, cellulose derivatives, organic colloids, salicylic acid, camphor, paraffin etc. Preferably, the additives used in the blend should be kept at amounts lower than 2 wt % of the blend. The powder materials and additives may be combined using any suitable technique known in the art. For example, a V-cone blender may be used.

Additional nominal alloying elements for the Ni—Cr alloys according to the present invention may be selected and incorporated based on the desired properties of the final strip, such as the mechanical properties, e.g. yield strength, ultimate tensile strength, and % elongation, etc. When incorporating nominal alloying elements, the Ni—Cr alloy strip made according to various embodiments of the present invention may include up to 3 wt % of the nominal alloying elements.

Upon adding any additives to obtain a powder blend, the material may then be roll compacted to form a green strip having a desired thickness. The powder material is preferably roll compacted by delivering the powder charge such that the powder cascades vertically between two horizontally opposed rolls with the powder fed into the roll nip in a uniform way.

The density and dimensions of the green strip is determined primarily by the physical properties of the powder and spacing provided between the horizontally opposed rolls as well as the forces applied by the rolls. The preferred thickness of the green strip is 0.050" to 0.200", more preferably 0.060" to 0.150". Because the initial green strip is substantially thinner than the Ni—Cr ingots produced by conventional processes, embodiments of the present invention may require less work, and as a result, less processing time, to provide a strip having the desired thickness upon finishing. It is preferred that the resulting green strip has a density that is 50% to 90% of theoretical density, more preferably 60% to 90% of theoretical density.

According to an embodiment of the present invention, a green strip may be provided by roll compacting as described above and followed by sintering. Sintering requires heating the green strip under a controlled atmosphere for a period of time. The sintering process reduces the oxygen content of the strip as well as provides inter-particle bonding and an increase in density, so that the strength of the resulting strip is significantly increased. It is preferred that sintering occur under a gaseous atmosphere comprising at least 10% hydrogen, more preferably 25% to 100% of hydrogen. Sintering may also occur under vacuum or partial pressure of an inert gas or more preferably under partial pressure of hydrogen. Sintering occurs at temperatures of 1000° C. to 1350° C., more preferably from 1100° C. to 1350° C., most preferably from 1150° C. to 1250° C. The sintering process may last from 1 to 12 hours when higher temperatures are used and 12 to 48 hours at the lower sintering temperatures.

In order to further reduce the thickness of the sintered strip to a lighter gauge material, embodiments of the present invention include a process comprising a combination of cold rolling and annealing the sintered strip to form the final strip. In embodiments of the present inventive method, it is preferred that the cold rolling steps occurs at room temperature. It is also preferred that cold rolling occurs under conditions which minimize oxidation of the sintered strip. Because the temperatures are generally low enough that oxidation is not a concern, cold rolling may occur under an oxygen containing atmosphere, such as air.

Cold rolling comprises working the material in order to reduce the strip's thickness. The strip may be passed one or more times through a rolling process. The total number of passes constituting one cold rolling cycle. According to an embodiment of the present invention, the strip thickness may be reduced 1% to 30% per pass, preferably 5% to 20% per pass, by cold rolling. The total reduction per rolling cycle is preferably 20% to 50%, more preferably 30% to 40%.

Embodiments of the present inventive method may also include recrystallization annealing steps. Recrystallization annealing is carried out at a temperature above the recrystallization temperature of the material in order to reduce its strength and hardness and is accompanied by changes in the microstructure. According to various embodiments of the present invention, the recrystallization anneal occurs at a temperature from 1900° F. to 2300° F. (about 1038° C. to 1260° C.). The total time required for a recrystallization anneal may be shorter if higher temperatures are used. Similar to sintering, annealing preferably occurs under a gaseous atmosphere comprising hydrogen and/or under partial pressure of hydrogen, or the recrystallization annealing may occur under vacuum or inert gas.

Embodiments of the present invention may include a plurality of cold rolling cycles with annealing steps occurring between each cold rolling cycle. Again, each cold rolling cycle may include multiple passes. Following the final cold rolling cycle, the Ni—Cr alloy strip has a thickness that is preferably 35% or less of the thickness of the original green strip, i.e. reduction of a green strip according to an embodiment of the present invention may require about 65% reduction or more to reach the target thickness.

EXAMPLES

In order that the invention may be more fully understood the following Examples are provided by way of illustration only.

Example 1

Powders containing 1,474 grams of nickel, 794 grams of chromium, and 39 grams of Fe—Si alloy were blended together in a V-cone blender. The blend was fed vertically down into a roll compaction mill to produce a green strip. The resulting green strip was sintered in a hydrogen atmosphere furnace at 2200° F. The strip thickness at this point was 0.096". The nominal composition of the sintered strip was 63.9% Ni, 34.4% Cr, 0.4 Fe %, and 1.3% Si (wt. percents).

The strip was subsequently rolled from 0.096" to 0.050", then from 0.050" to 0.030", and finally from 0.030" to 0.020" with intermediate anneals at 1900° F. for 10 minutes. The final 0.020" thick strip was slit to have a width of 0.500", annealed at 2100° F., and tested for its mechanical properties using standard ASTM E8 test procedures. The measured values for the mechanical properties were the following:

Yield Strength: 25.3 ksi

Ultimate Tensile Strength: 83.2 ksi

% Elongation: 46.6

A magnified image of the microstructure of the strip made in Example 1 is provided as FIG. 1.

Example 2

Powders containing 1361 grams of nickel, 907 grams of chromium, and 39 grams of Fe—Si alloy were blended together in a V-cone blender. The blend was fed vertically down into a roll compaction mill to produce a green strip. The resulting green strip was sintered in a hydrogen atmosphere furnace at temperature of 2200° F. The strip thickness at this point was 0.108" thick. The nominal composition of the sintered strip was 59.0% Ni, 39.3% Cr, 0.4% Fe, and 1.3% Si (wt. percents).

The strip was rolled from 0.108" to 0.050", from 0.050" to 0.030", and finally from 0.030" to 0.020" with intermediate anneals at 1900° F. for 10 minutes. The final 0.020" thick strip was slit to have a width of 0.500", annealed at 2100° F., and tested for its mechanical properties using standard ASTM E8 test procedures. The measured values for the mechanical properties were as follows:

Yield Strength: 45.9 ksi

Ultimate Tensile Strength: 101.2 ksi

% Elongation: 42.8

While preferred embodiments of the invention have been shown and described herein, it will be understood that such embodiments are provided by way of example only. Numerous variations, changes, and substitutions may occur to those skilled in the art without departing from the spirit of the invention. Accordingly, it is intended that the appended claims cover all such variations that fall within the spirit and scope of the invention.

What is claimed:

1. An alloy comprising nickel and chromium having a combined wt. % of nickel and chromium of at least 97 wt. %, wherein the chromium accounts for 33 to 50 wt. % of the alloy, wherein the alloy is provided in strip form, and wherein the strip has a tensile elongation as determined using ASTM E8 of at least 30%.

2. The alloy of claim 1, wherein a roll compaction process is used to produce the strip.

3. The alloy of claim 1, wherein the chromium accounts for 35 to 50 wt. % of the alloy.

4. The alloy of claim 1, wherein the chromium accounts for 40 to 50 wt. % of the alloy.

5. The alloy of claim 1, wherein the alloy comprises less than 3 wt. % of Mn and Si combined.

6. The alloy of claim 1, wherein the nickel accounts for at least 47 wt. % of the alloy.

7. A welding electrode sheath comprising the alloy of claim 1.

8. An alloy comprising nickel and chromium having a combined wt. % of nickel and chromium of at least 99.8 wt. %, wherein the chromium accounts for 33 to 50 wt. % of the alloy, wherein the alloy is provided in strip form, and wherein the strip has a tensile elongation as determined using ASTM E8 of at least 30%.

9. The alloy of claim 8, wherein a roll compaction process is used to produce the strip.

10. The alloy of claim 8, wherein the chromium accounts for 35 to 50 wt. % of the alloy.

11. The alloy of claim 8, wherein the chromium accounts for 40 to 50 wt. % of the alloy.

12. The alloy of claim 8, wherein the alloy comprises essentially 0% Mn and Si.

13. The alloy of claim 8, wherein the nickel accounts for at least 49.8 wt. % of the alloy.

14. A welding electrode sheath comprising the alloy of claim 8.

15. A method of making an alloy strip comprising:

forming a powder charge, wherein the powder charge comprises 97 to 100 wt. % of nickel and chromium combined and the chromium accounts for 33 to 50 wt. % of the charge;

roll compacting the powder charge to form a green strip;

sintering the green strip to form a sintered strip; and cold rolling and annealing the sintered strip to form the alloy strip.

16. The method of claim 15, wherein the powder charge is formed from at least one of a nickel containing powder and chromium containing powder that is at least 99.5% pure.

17. A method of making a sheath for a flux cored welding electrode comprising forming the sheath from the alloy made according to claim 15.

18. A method of making an alloy strip comprising:

forming a powder charge, wherein the powder charge comprises at least 99.8 wt. % of nickel and chromium combined and the chromium accounts for 33 to 50 wt. % of the charge;

roll compacting the powder charge to form a green strip;

sintering the green strip to form a sintered strip; and cold rolling and annealing the sintered strip to form the alloy strip.

19. The method of claim 18, wherein the powder charge is formed from at least one of a nickel containing powder and chromium containing powder that is at least 99.8% pure.

20. A method of making a sheath for a flux cored welding electrode comprising forming the sheath from the alloy made according to claim 18.

* * * * *